Nov. 9, 1948.  J. M. LESER ET AL  2,453,631
COMBINATION BABY CARRIAGE AND SHOPPING CART
Filed April 11, 1946  2 Sheets-Sheet 1
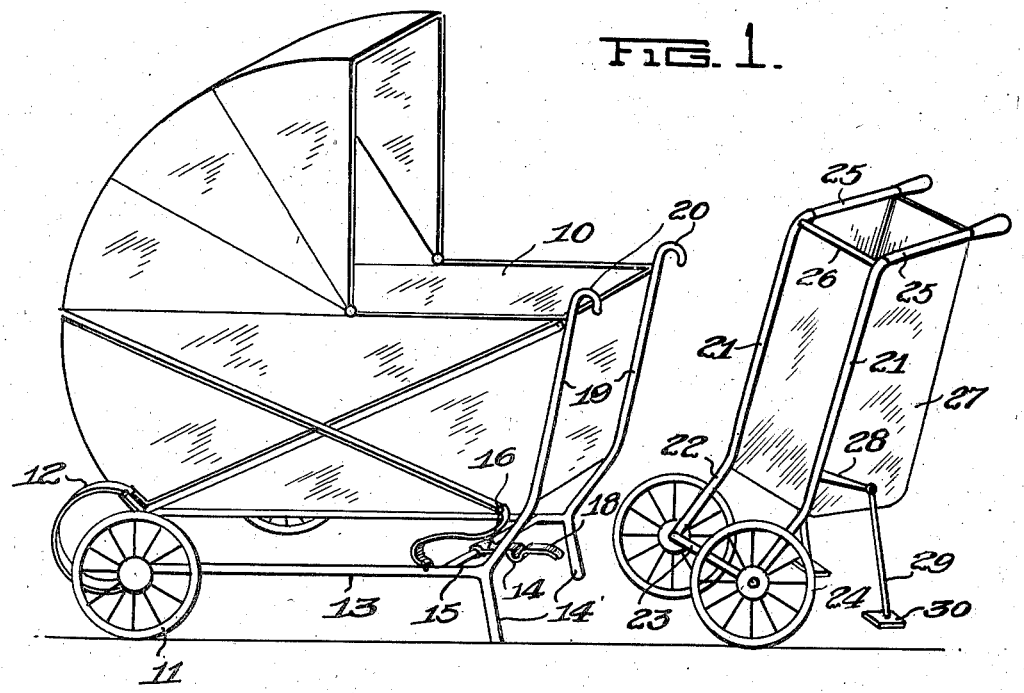
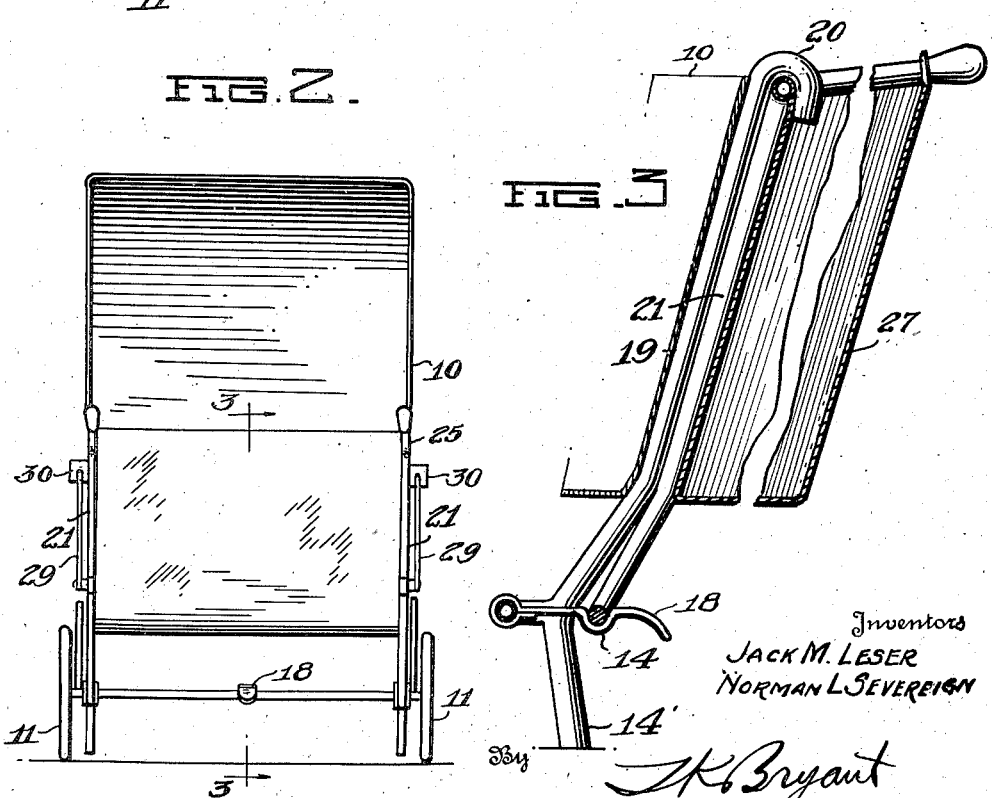
Inventors
JACK M. LESER
NORMAN L. SEVEREIGN
By J. K. Bryant
Attorney

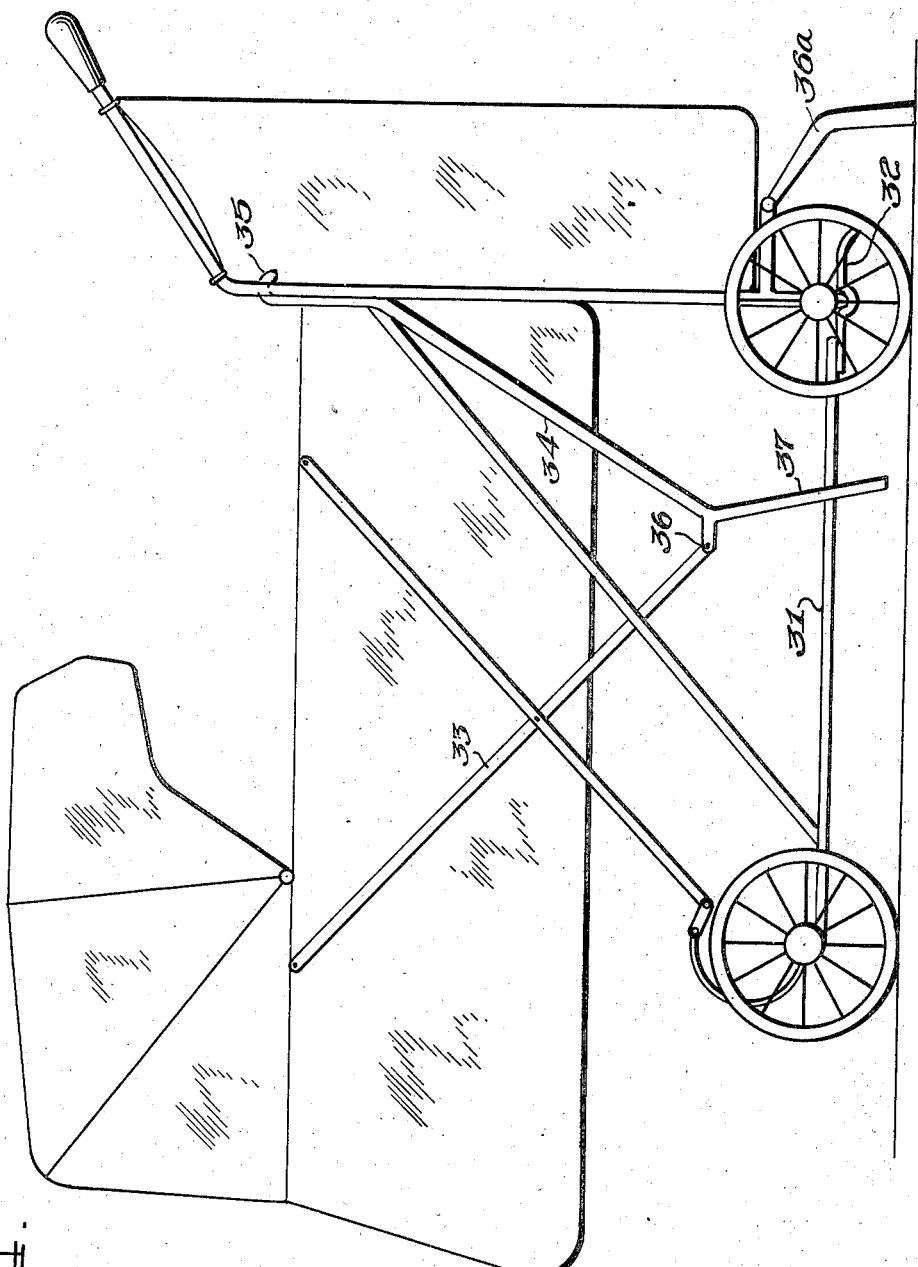

Patented Nov. 9, 1948

2,453,631

UNITED STATES PATENT OFFICE 2,453,631

COMBINATION BABY CARRIAGE AND SHOPPING CART

Jack M. Leser and Norman Louis Severeign, Milwaukee, Wis.

Application April 11, 1946, Serial No. 661,220

8 Claims. (Cl. 280—34)

This invention relates to a combination baby carriage and shopping cart.

One important object of the invention is to provide a combined device of the character set forth wherein the baby carriage and shopping cart are detachable from each other so that the shopping cart may be used separately from the baby carriage.

A second important object of the invention is to provide a device of this character wherein the baby carriage, when detached from the shopping cart, will remain in erect position.

A third important object of the invention is to provide a detachable shopping cart having supporting means whereby the shopping cart may be held in erect position for filling or emptying.

A fourth important object of the invention is to provide a simple and efficient means whereby the baby carriage and shopping cart may be engaged or disengaged.

With the above and other objects in view, the invention consists in general of certain novel details of construction and combinations of parts hereinafter fully described, illustrated in the accompanying drawings, and particularly claimed.

In the accompanying drawings like characters of reference indicate like parts in the several views, and:

Figure 1 is a perspective view showing the improved baby carriage and shopping cart detached from each other, Figure 2 is a front elevation of the carriage and shopping cart assembled.

Figure 3 is an enlarged fragmentary detail along the line 3—3 of Figure 2, and

Figure 4 is a side elevation of the invention in a slightly modified manner.

As here shown, the invention includes a baby carriage having a body 10 of ordinary form and at one end this body is provided with a pair of wheels 11 connected to the body by suitable springs 12. The lower frame member 13 of the body has at its forward end a downwardly extending leg 14' so that this leg will support the body in a substantially horizontal position. The two frame members 13 on opposite sides of the body are connected by a transverse member 15 which carries a rearwardly projecting spring member 16 bent to provide a notch 14 intermediate its ends and having the rear end turned down as at 18. The front frame members 19 of the body are provided at their upper ends with downwardly opening and forwardly extending hook portions 20.

The shopping cart has a structure including a pair of upwardly extending frame members 21 which are inclined as at 22 to carry an axle 23 supported by wheels 24. The members 21 are continued forwardly to form handle bars 25 and at the bend of the members 21 these members are connected by a cross bar 26. The members 21 are so spaced that when the device is assembled they will lie slightly outside of the members 19, thus enabling the hooks 20 to engage on the cross bar 26. At the same time the inclination of the frame parts 22 braces the axle 23 in position to glide up over the end 18 of the spring and come to rest in the notch 14. Thus the baby carriage and shopping cart may be secured together with great ease. The shopping cart is provided with the usual body 27 and from the frame members 21 extends arms 28 to the ends of which are pivoted struts 29 having feet 30. These struts 29 may be turned up to lie alongside of the body 27 when the device is being moved from place to place, but when the device is stopped and the cart disengaged from the carriage the members 29 may be dropped so that they rest on the floor and form a four-legged support for the shopping cart when taken in connection with the wheels 24.

In the modification shown in Figure 4, the frame of the baby carriage is somewhat changed. Here there is provided a bottom frame 31 carrying the spring member 32 which is of the same nature as that shown in Figures 1 and 3. Also the baby carriage has a fixed frame member 33 on each side to which is pivoted a forwardly and upwardly extending frame member 34 carrying a hook 35 at its upper end. This member 34 extends down below the pivot point 36 to form supporting legs 37. The supporting device for the shopping cart is in this form somewhat modified, the strut 29 and foot 30 being replaced on each side by a pivotally connected strut 36a. Otherwise the shopping cart is substantially the same as shown in Figure 1. It will be understood that sufficient friction is present in the pivotal connection between the arms 28 and struts 29 in Figures 1 to 3, and also in the pivot for the struts 36a shown in Figure 4, so that the shopping carts shown in Figures 1 and 4 will remain in upright position under the stress of normal loads.

In operation a person using the device may take an infant in the baby carriage and go to a store or market and on arriving there may detach the shopping cart from the carriage, leaving the carriage safely positioned against movement while going through the store and making such purchases as may be desired. Upon returning, the parts are connected and the user can proceed elsewhere as though rolling a four-wheeled carriage. Obviously, if desired, the carriage portion may be left at home and the shopping cart used entirely independently.

There has thus been provided a simple and efficient device of the kind described and for the purposes specified.

We claim:

1. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar.

2. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar, said body carriage frame having supporting means at the end remote from said carriage wheels.

3. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar, said cart having foldable supporting means spaced from the cart wheels.

4. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar, said body carriage frame having supporting means at the end remote from said carriage wheels, said cart having foldable supporting means spaced from the cart wheels.

5. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar, said cart wheels having an axle and said carriage frame having a spring clip engaging said axle when the cart and carriage are assembled.

6. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar, said body carriage frame having supporting means at the end remote from said carriage wheels, said cart wheels having an axle and said carriage frame having a spring clip engaging said axle when the cart and carriage are assembled.

7. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar, said cart having foldable supporting means spaced from the cart wheels, said cart wheels having an axle and said carriage frame having a spring clip engaging said axle when the cart and carriage are assembled.

8. In combination, a body carriage having a frame, said frame being provided with a ground-engaging pair of wheels at one end and a pair of downwardly opening hooks at the other end, and a shopping cart including a frame having a cross-bar engageable in said hooks and having a pair of wheels adapted to form the second pair of wheels for the combined vehicle upon engagement of said hooks and cross-bar, said body carriage frame having supporting means at the end remote from said carriage wheels, said cart having foldable supporting means spaced from the cart wheels, said cart wheels having an axle and said carriage frame having a spring slip engaging said axle when the cart and carriage are assembled.

JACK M. LESER.
NORMAN LOUIS SEVEREIGN.

REFERENCES CITED

The following references are of record in the file of this patent:

UNITED STATES PATENTS

| Number | Name | Date |
|---|---|---|
| 1,105,731 | Wells | Aug. 4, 1914 |
| 1,135,603 | Mead | Apr. 13, 1915 |
| 1,388,756 | Peters | Aug. 23, 1921 |
| 1,434,572 | Turner | Nov. 7, 1922 |
| 1,474,493 | Roe | Nov. 29, 1923 |

FOREIGN PATENTS

| Number | Country | Date |
|---|---|---|
| 24,109 | Denmark | Feb. 7, 1919 |